US 11,315,707 B2

(12) United States Patent
Watanabe

(10) Patent No.: US 11,315,707 B2
(45) Date of Patent: Apr. 26, 2022

(54) METHOD OF PRODUCING LONG BODY

(71) Applicant: JUNKOSHA INC., Ibaraki (JP)

(72) Inventor: Hiroaki Watanabe, Ibaraki (JP)

(73) Assignee: JUNKOSHA INC., Ibaraki (JP)

(*) Notice: Subject to any disclaimer, the term of this patent is extended or adjusted under 35 U.S.C. 154(b) by 0 days.

(21) Appl. No.: 17/275,031

(22) PCT Filed: Sep. 11, 2019

(86) PCT No.: PCT/JP2019/035757
§ 371 (c)(1),
(2) Date: Jul. 13, 2021

(87) PCT Pub. No.: WO2020/054778
PCT Pub. Date: Mar. 19, 2020

(65) Prior Publication Data
US 2022/0044846 A1 Feb. 10, 2022

(30) Foreign Application Priority Data

Sep. 11, 2018 (JP) .............................. JP2018-170100
Oct. 18, 2018 (JP) .............................. JP2018-196737

(51) Int. Cl.
H01B 13/06 (2006.01)
H01B 7/08 (2006.01)
(Continued)

(52) U.S. Cl.
CPC ............... H01B 13/06 (2013.01); B32B 1/08 (2013.01); B32B 7/02 (2013.01); B32B 7/12 (2013.01);
(Continued)

(58) Field of Classification Search
CPC .... H01B 13/06; H01B 7/0216; H01B 7/0225; H01B 7/0838; B29C 66/433;
(Continued)

(56) References Cited

U.S. PATENT DOCUMENTS

2003/0196828 A1* 10/2003 Schilson ................ H05K 3/281
174/117 F
2007/0175652 A1 8/2007 Narumi
(Continued)

FOREIGN PATENT DOCUMENTS

JP 2006-019125 A 1/2006
JP 2015-127142 A 7/2015
JP 2016-534516 A 11/2016

OTHER PUBLICATIONS

Jan. 13, 2021, Japanese Decision to Grant Patent issued for related JP Application No. 2018-196737.
(Continued)

Primary Examiner — Scott W Dodds
(74) Attorney, Agent, or Firm — Paratas Law Group, PLLC

(57) ABSTRACT

There is provided a method of producing a long body covered with a covering layer, in which the long body includes at least plural electric wires and/or tubes, the covering layer includes at least a specific intermediate layer and a specific outermost layer, the method including at least: covering the long body with the covering layer; and fixing positions of the plural electric wires and/or tubes.

4 Claims, 3 Drawing Sheets

(51) Int. Cl.
- *B32B 27/32* (2006.01)
- *B32B 27/08* (2006.01)
- *B32B 37/06* (2006.01)
- *B32B 7/12* (2006.01)
- *B32B 37/12* (2006.01)
- *B32B 27/28* (2006.01)
- *B32B 1/08* (2006.01)
- *B32B 7/02* (2019.01)
- *H01B 7/02* (2006.01)
- *B29C 65/00* (2006.01)
- *B32B 37/14* (2006.01)

(52) U.S. Cl.
CPC ............ *B32B 27/08* (2013.01); *B32B 27/285* (2013.01); *B32B 27/322* (2013.01); *B32B 37/06* (2013.01); *B32B 37/12* (2013.01); *H01B 7/0216* (2013.01); *H01B 7/0838* (2013.01); *B29C 66/7313* (2013.01); *B29C 66/73161* (2013.01); *B32B 37/144* (2013.01); *B32B 2307/72* (2013.01); *B32B 2327/18* (2013.01); *B32B 2371/00* (2013.01); *B32B 2597/00* (2013.01)

(58) Field of Classification Search
CPC .......... B29C 66/7313; B29C 66/73132; B29C 66/73161; B29C 66/73162
See application file for complete search history.

(56) References Cited

U.S. PATENT DOCUMENTS

| | | |
|---|---|---|
| 2016/0225487 A1 | 8/2016 | Koeppendoerfer et al. |
| 2017/0103828 A1* | 4/2017 | Sugita .................. H01B 3/302 |
| 2017/0157891 A1 | 6/2017 | Soda et al. |
| 2017/0271044 A1* | 9/2017 | Kondo .................. B29C 63/04 |
| 2018/0053583 A1* | 2/2018 | Koliatene ................ H01B 7/28 |

OTHER PUBLICATIONS

Nov. 26, 2019, International Search Report issued for related PCT application No. PCT/JP2019/035757.

Nov. 26, 2019, International Search Opinion issued for related PCT application No. PCT/JP2019/035757.

\* cited by examiner

METHOD OF PRODUCING LONG BODY

CROSS REFERENCE TO PRIOR APPLICATION

This application is a National Stage Patent Application of PCT International Patent Application No. PCT/JP2019/035757 (filed on Sep. 11, 2019) under 35 U.S.C. § 371, which claims priority to Japanese Patent Application Nos. 2018-170100 (filed on Sep. 11, 2018) and 2018-196737 (filed on Oct. 18, 2018), which are all hereby incorporated by reference in their entirety.

TECHNICAL FIELD

The present invention relates to a long body composed of electric wires, tubes, etc. and a production method thereof.

BACKGROUND ART

A flat cable in which plural electric wires, tubes, etc. are parallelly arranged in a flat shape or a round cable in which plural electric wires, tubes, etc. are twisted together is used for electrically connecting a movable unit and a fixed unit of a machine tool or the like. This flat cable or round cable is provided with a covering layer on its outer surface(s) to protect it from friction caused by external stress, corrosion, or the like. In general, such a cable is, in many cases, required to be flexible and hence polyvinyl chloride (PVC), urethane, or an olefine-based resin is used as a material of the covering layer. However, since these resins contain additives such as a flame retardant, a plasticizer, and an antioxidant, a problem arises that bleeding out of the additives may cause pollution in the case where the cable is used in, for example, a clean room of a semiconductor or organic EL manufacturing machine.

A fluororesin such as polytetrafluoroethylene (PTFE) is used as a material of the covering layer because it is superior in, for example, cleanliness (containing no plasticizer etc.), slipperiness, heat resistance, incombustibility, chemical resistance, or electrical characteristics such as low permittivity. Patent document 1 (JP-A-2006-19125) discloses a flat cable in which a PTFE sheet or a porous PTFE sheet is used as a covering layer as a flat cable that is superior in environmental durability such as heat resistance and chemical resistance as well as in freely bendable property, bendability, flexibility, and slipperiness.

SUMMARY OF INVENTION

Technical Problem

The present invention has been made in view of the above points and has an object of providing a production method of a long body that is superior in slipperiness, bendability, and flexibility and is low in pollution caused in the surroundings.

Solution to Problem

The above object is attained by a long body produced by a production method according to the invention. That is, the invention provides a method of producing a long body covered with a covering layer, wherein the long body at least includes a plural covering targets selected from a group consisting of electric wires and tubes, the covering layer at least includes an intermediate layer and an outermost layer, the intermediate layer employs a resin film having a density $\rho 1$ of 0.2 g/cm$^3$ or more and 1.8 g/cm$^3$ or less and having a PV1 value, which is a surface peak-to-valley value, of 5 μm or more, the outermost layer employs a resin film having a density $\rho 2$ of 1.2 g/cm$^3$ or more and 2.5 g/cm$^3$ or less, the method comprises at least:

covering the long body with the covering layer; and fixing positions of the plural covering targets, and the following formulas (1) and (3) are satisfied in the case that a PV2 value, which is a surface peak-to-valley value, of the outermost layer is 5 μm or less, and the following formulas (2) and (3) are satisfied in the case that the PV2 value is larger than 5 μm:

$$PV1 - PV2 \geq 2 \text{ μm} \tag{1}$$

$$PV2 - PV1 > 0 \text{ μm} \tag{2}$$

$$\rho 2 - \rho 1 \geq 0.1 \text{ g/cm}^3 \tag{3}$$

It is preferable that the intermediate layer have a porous structure. Since the intermediate layer has the porous structure, the pores of the intermediate layer are deformed when the long body is bent, whereby a load is reduced and high flexibility is thus obtained. The term "intermediate layer" as used in the invention means a maximum thickness layer among the layers of the covering layer.

It is also preferable that the covering layer further includes a functional layer. In the case that at least one of the outermost layer and the intermediate layer is made from a fluororesin or the like, in many cases the adhesion to a counterpart material is weak. Providing an adhesive layer increases the durability of the covering layer and hence is useful. The adhesive layer may employ a hot-melt resin or the like that is lower in melting point than the resin film constituting the outermost layer or the resin film constituting the intermediate layer.

Advantageous Effects of Invention

The invention can provide a long body that is superior in slipperiness, bendability, and flexibility and is low in pollution caused in the surroundings, and a production method thereof.

DESCRIPTION OF EMBODIMENTS

Preferred embodiments of the present invention will be hereinafter described with reference to the drawings. The embodiments to be described below are not intended to restrict the claimed invention and not every combination of features described in each embodiment is indispensable for the invention.

Figure 1:
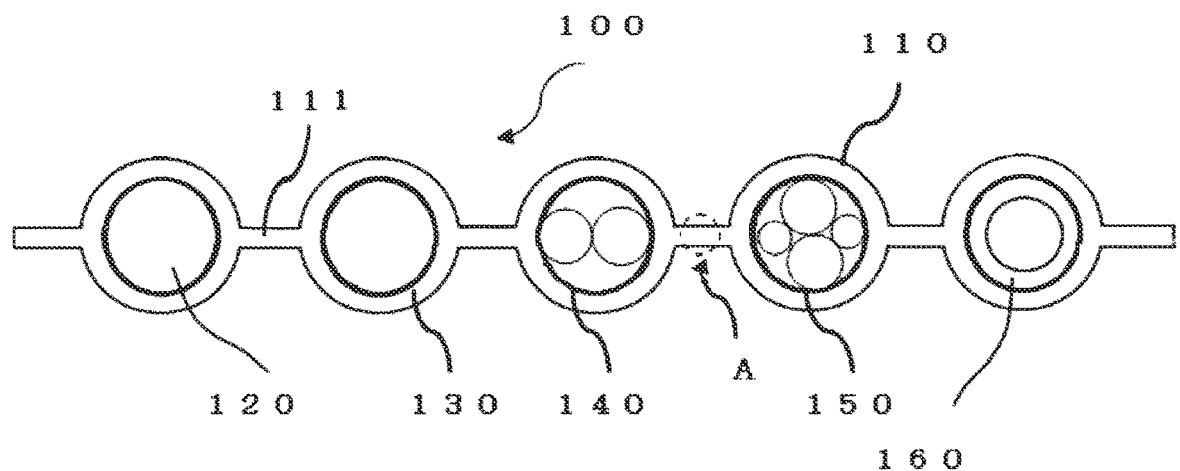
FIG. 1 is a schematic view of an example of long body produced by a production method according to the invention, and is a sectional view of the long body.

FIG. 1 is a schematic sectional view of a long body 100 having a flat shape which is an example of long body produced by a production method according to the invention. The long body 100 is configured by preparing plural covering targets of electric wire(s), tube(s) or both thereof and arranging them side by side or in parallel with each other. Although in the example of long body shown in FIG. 1, the number of cores of covering targets is five, the number of cores is not limited to it. Covering layers 110 are disposed so that the covering targets are sandwiched between them from both sides (in the top-bottom direction in FIG. 1). In portions: web portions 111 where the covering layers 110 are joined together through the covering targets, the covering layers 110 are connected by sintering or fusing. Each of the electric wires and/or tubes as the covering targets of the long body 100 is held and fixed at prescribed positions by the connection of the covering layers 110.

In the example of long body shown in FIG. 1 which is produced by the production method according to the invention, the plural covering targets of electric wire(s), tube(s) or both thereof, which are arranged in parallel with each other, are used. A covering target 120 is a single FEP electric wire, a covering target 130 is a single PFA electric wire, a covering target 140 is a two-core parallel cable in which two FEP electric wires are arranged in parallel with each other, and a covering target 150 is a cable obtained by twisting four PFA electric wires together. A covering target 160 is a single FEP tube. The covering targets 120 to 160 are arranged in parallel with each other and the covering layers 110 are disposed in the top-bottom direction. Although in the example of long body shown in FIG. 1, the number of cores of covering targets is five, the number of cores is not limited to it. The covering targets can be selected, according to necessary functions, from a single covered conductor, a two-parallel-core cable, plural cables twisted together, a coaxial cable, a tube, and the likes.

As another example of long body that is different from the one shown in FIG. 1 and produced by the production method according to the invention, there may be also a configuration to have a single electric wire and a single tube as the covering target.

Figure 2:
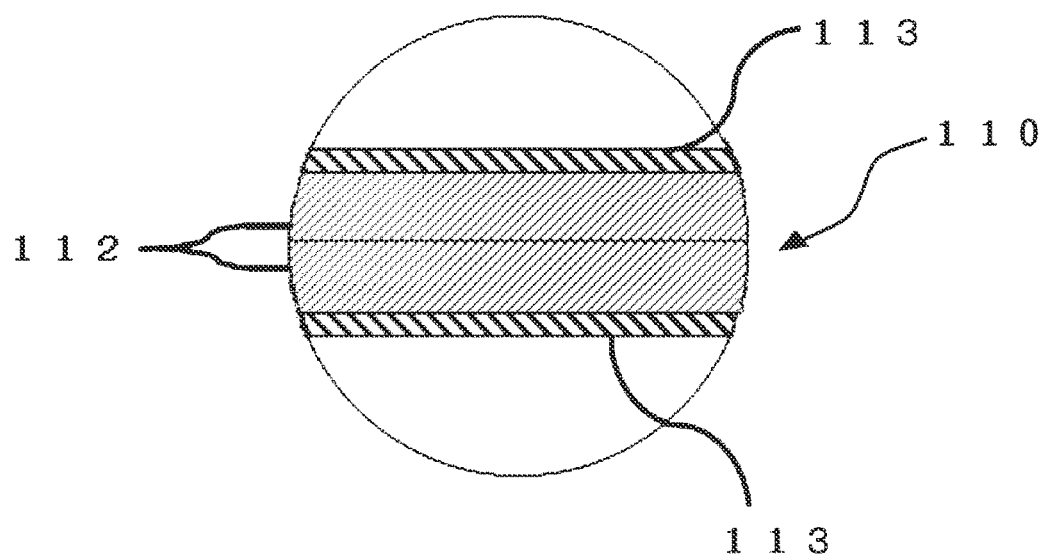
FIG. 2 is an enlarged sectional view of part A of covering layer of the long body shown in FIG. 1.

FIG. 2 is an enlarged sectional view of part A of the covering layer 110 of the long body shown in FIG. 1. The covering layer 110 is composed of at least an intermediate layer 112 and an outermost layer 113.

A resin film having a density $\rho 1$ of 0.2 g/cm$^3$ or more and 1.8 g/cm$^3$ or less is used as the intermediate layer 112. The PV1 value of the surface of the resin film constituting the intermediate layer 112 is 5 μm or more. It is preferable that the resin constituting the intermediate layer 112 is a fluororesin such as polytetrafluoroethylene (PTFE), a tetrafluoroethylene-perfluoroalkylvinyl ether copolymer (PFA), a tetrafluoroethylene-hexafluoropropylene copolymer (FEP), or polyvinylidene fluoride (PVDF), a polyolefin resin such as polyethylene (PE), or the like.

It is preferable that as mentioned above, the resin film having a density $\rho 1$ of 0.2 g/cm$^3$ or more and 1.8 g/cm$^3$ or less is used as the intermediate layer 112, more preferably a resin film having a density $\rho 1$ of 0.3 g/cm$^3$ or more and 1.3 g/cm$^3$ or less and particularly preferably a resin film having a density $\rho 1$ of 0.4 g/cm$^3$ or more and 1.0 g/cm$^3$ or less. For example, the density of a polytetrafluoroethylene (PTFE) resin or a polyethylene (PE) resin can be controlled by processing conditions performed thereon. These resins can be worked into a porous structure by stretching. Thus, to lower the density, a porous structure composed of plural fibrils and pores formed between the fibrils can be obtained by, after the resin is molded into a sheet form, stretching the molded sheet while heating. Basically, the density is lowered by increasing the stretching ratio. In the case that stretching is performed by a single-axis stretching method in which stretching is performed from one direction, a resin film that has plural consecutive nodes and is high in physical strength can be formed. In the case that stretching is performed by a two-axis stretching method in which stretching is performed from two directions, a resin film that is lower in density can be formed, and the flexibility is increased further. The density can be also controlled by adjusting the firing temperature and time of the firing of a molded sheet and adjusting a fired state as a completely fired state, a half-fired state, or an unfired state. Furthermore, for example, it is possible to use a resin film that is worked into a porous structure through foaming at the time of extrusion molding or a resin film that is worked into a porous structure by mixing a resin and a solvent at a high temperature and then separating the mixture into two layers by lowering the temperature.

A resin film having a density $\rho 2$ of 1.2 g/cm$^3$ or more and 2.5 g/cm$^3$ or less can be used in the outermost layer 113.

It is preferable that the resin constituting the outermost layer 113 is a fluororesin such as PTFE, tetrafluoroethylene-perfluoroalkylvinyl ether copolymer (PFA), a tetrafluoroethylene-hexafluoropropylene copolymer (FEP), a tetrafluoroethylene-ethylene copolymer (ETFE), or polychlorotrifluoroethylene (PCTFE) or a resin that does not contain a plasticizer such as polyether ether ketone (PEEK) or polyimide (PI). In general, a resin film having a thickness of 5 to 100 μm is used in the outermost layer 113.

In the case that the PV2 value of the surface of the resin film constituting the outermost layer 113 is 5 μm or less, resin films are used so that the PV1 value of the surface of the resin film constituting the intermediate layer 112 and the PV2 value of the surface of the resin film constituting the outermost layer 113 satisfy a relationship of PV1−PV2≥2 μm and that the density $\rho 2$ of the resin film constituting the outermost layer 113 and the density $\rho 1$ of the resin film constituting the intermediate layer 112 satisfy a relationship of $\rho 2 - \rho 1 \geq 0.1$ g/cm$^3$. In the case that the PV2 value of the surface of the resin film constituting the outermost layer 113 is larger than 5 μm, resin films are used that the PV1 value and the PV2 value satisfy a relationship of PV2−PV1>0 μm and that the density $\rho 2$ of the resin film constituting the outermost layer 113 and the density $\rho 1$ of the resin film constituting the intermediate layer 112 satisfy a relationship of $\rho 2 - \rho 1 \geq 0.1$ g/cm$^3$. The PV1-PV2 relationship suitable for the invention is switched at a point where the PV2 of the surface of the long body produced by the production method according to the invention is just equal to 5 μm. It is preferable that a relationship of $\rho 2 - \rho 1 \geq 0.3$ g/cm$^3$ be satisfied, and more preferable that a relationship of $\rho 2 - \rho 1 \geq 1.0$ g/cm$^3$ be satisfied.

The long body produced by the production method according to the invention can attain the object of the invention by the above-described constitution. While being high in flexibility, the long body can lower the degree of adhesion of foreign matters remaining on the surface of the covering layer. That is, foreign matters such as a very small amount of oil, surrounding particles, chemicals, and water in surrounding air are hard to adhere during, for example, cable handling, a process of attachment to an assembly or a machine, and operation of a machine, and can be removed easily. As a result, the long body is hard to pollute the surroundings when placed in a clean environment, and hardly generates out gas, dust particles due to wear of the long body itself, and the likes. As such, the long body as not polluting the surroundings can be obtained.

Figure 3:
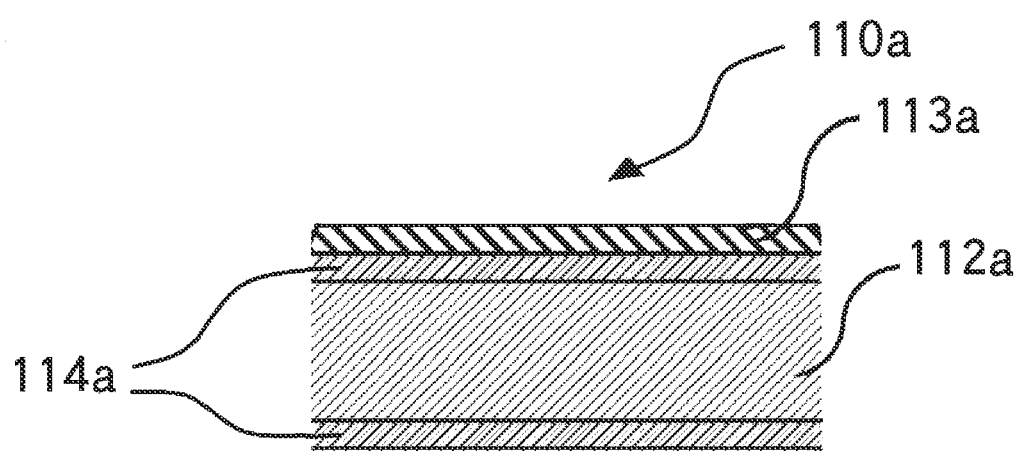
FIG. 3 is an enlarged sectional view of part of a covering layer of long body.

FIG. 3 shows another example of a covering layer of long body produced by the production method according to the invention. The covering layer can be provided with a functional layer in addition to an intermediate layer and an outermost layer. In a covering layer 110a, an adhesive layer 114a is provided between an intermediate layer 112a and an outermost layer 113a, whereby the adhesion between the intermediate layer 112a and the outermost layer 113a is increased and the covering layer 110a is made more durable when the long body is slid. Furthermore, another adhesive layer 114a is provided on the surface, opposite to the outermost layer 113a, of the intermediate layer 112a, whereby the covering layers 110a can be joined to and unitized with each other at a temperature that is lower than the melting point of the resin film constituting intermediate layer 112a or the resin film constituting outermost layer 113a. Since the covering layers 110a can be joined to each other at such a temperature that influence on the resin film constituting intermediate layer 112a and the resin film constituting outermost layer 113a is smaller, the function of the covering layers 110a can be kept superior and the covering layers 110a can be made highly durable. As the adhesive layers 114a, for example, a hot-melt fluororesin or an olefin resin such as polyethylene may be used. A functional layer other than the adhesive layer can be also provided according to a function required by the long body, such as a solvent barrier property.

Figure 4:
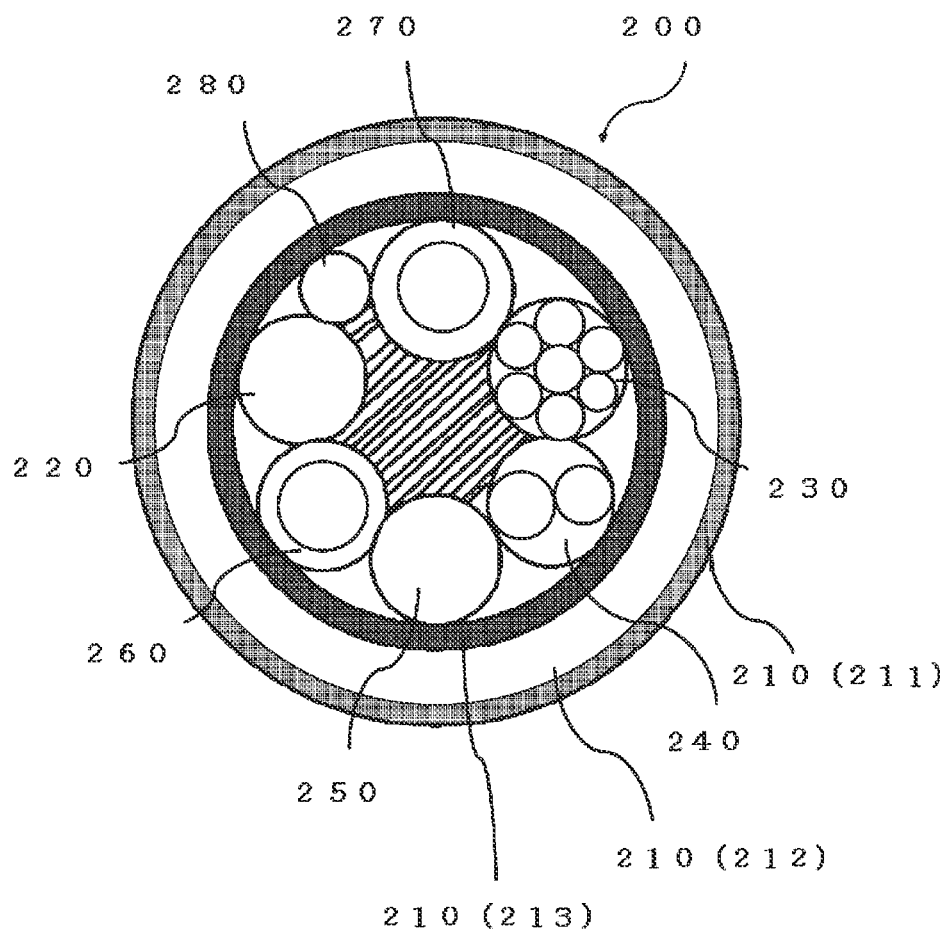
FIG. 4 is a schematic view of another example of long body produced by the production method according to the invention, and is a sectional view of the long body.

FIG. 4 is a sectional view of a round-shaped long body according to another embodiment of the invention. A covering layer 210 of a long body 200 is composed of an outermost layer 211, an intermediate layer 212, and an adhesive layer 213. As covering targets, the product where single or plural electric wires, tubes or both thereof are twisted together, is twisted to be used. Symbol 220 is single FEP electric wire. Symbol 230 is a cable obtained by twisting seven PFA electric wires together. Symbol 240 is a cable obtained by twisting two FEP electric wires together. Symbol 250 is single PFA electric wire. Each of symbols 260 and 270 is single nylon tube. Symbol 280 is a tin-plated soft copper wire (drain line). The covering targets 220 to 280 are twisted together and the covering layer 210 is wound around the outside of a resulting twisted body. After the winding, overlapping portions of the tape are jointed together by heating them. As a result of the joining of the covering layer 210, each of the covering targets, that is, the electric wires and/or tubes, is held and fixed at prescribed positions. The structure and number of covering targets, that is, electric wires and/or tubes, are not restricted to the example described above, and they may be single or plural electric wires twisted together or arranged in parallel with each other. Apart of the electric wires twisted together may be replaced by a tube or tubes.

The invention will be described in more detail using Examples described below. The Examples described below are not intended to restrict the claimed invention.

EXAMPLES

<Measurement of Peak-to-Valley (PV) Value>

Figure 5:
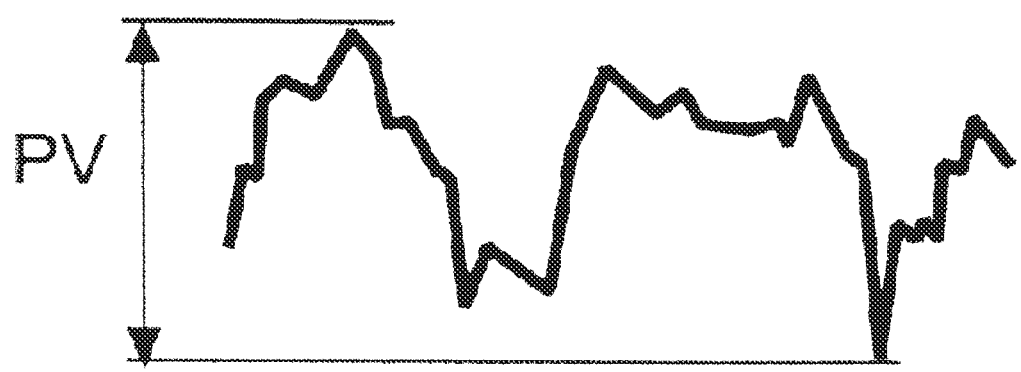
FIG. 5 is a drawing explaining a peak-to-valley value employed in the invention.

A measurement was performed using a white light interference microscope New View 6300 manufactured by Zygo Corporation. A white LED was used as a light source and a Gaussian filter was used for surface filtering processing. A measurement resolution in the height direction was 0.1 nm. The observation magnification was set at fifty times and a high-frequency-side cutoff frequency (filter high wavelength) and a low-frequency-side cutoff frequency (filter low wavelength) were set at 0.00250 mm and 0.80000 mm, respectively. A surface shape was measured and a peak-to-valley (PV) value was calculated. Measurement data was analyzed using analysis software: MetroPro. FIG. 5 is a drawing explaining a PV value employed in the invention, and is drawn using an example of surface profile data obtained by a measurement. As shown in FIG. 5, the PV value means a distance in the height direction between a highest point and a lowest point of a measurement surface.

<Measurement of Density ρ>

A specific weight that was measured by DENSIMETER H manufactured by Toyo Seiki Seisaku-sho, Ltd. according to a collecting gas over water prescribed in JIS K 6301 was employed as a density.

<Evaluation of Cleanliness>

Foreign matter hardly adhesive property and foreign matter easily removable property were evaluated for adhesion of foreign matter to a long body. To evaluate the hardly adhesive property and easily removable property, ink was applied to the surface, and then an adhering state of ink and an amount of ink component that remained after the ink was wiped out by a cotton cloth, were checked. The ink component adhering state and an ink residual amount were evaluated in five levels. A case that no ink component adhered was evaluated to be "5", a case that an ink component adhered slightly but was able to be removed completely by wiping-out was evaluated to be "4", a case that an ink component adhered slightly and a trace of ink was slightly found after wiping-out was evaluated to be "3", a case that ink adhered and a trace of ink was found after wiping-out was evaluated to be "2", and a case that ink adhered and almost ink was not removed by wiping-out was evaluated to be "1".

Example 1

A PTFE resin film was used as an outermost layer and another PTFE resin film was used as an intermediate layer located inside the outermost layer. Resin films that had been cut so as to have a prescribed width were prepared. A thickness, a PV value, and a density of the resin film of each of the outermost layer or the intermediate layer were measured. Results are shown in Table 1.

Next, a covering layer was produced by laminating and heating the two resin films. Covering targets were prepared in such a manner that one FEP electric wire, one FEP electric wire, one cable obtained by twisting four PFA electric wires together, one cable obtained by twisting two PFA electric wires together, and one FEP tube were arranged horizontally. A long body was produced by disposing the covering layers over and under the arranged covering targets and fixing the positions of the respective covering targets by heating web portions.

An evaluation result of cleanliness is shown in Table 1.

Example 2

A PTFE resin film was used as an outermost layer, a 0.02-μm-thick FEP resin film was used as an adhesive layer located inside the outermost layer, another PTFE resin film was used as an intermediate layer located further inside, and a 0.02-μm-thick FEP resin film was used as an adhesive layer located still further inside. Resin films that had been cut so as to have a prescribed width were prepared. A thickness, a PV value, and a density of the resin film of each of the outermost layer or the intermediate layer were measured. Results are shown in Table 1.

Next, a covering layer was produced by laminating and heating the four resin films. Covering targets were prepared in such a manner that one FEP electric wire, one FEP electric wire, one cable obtained by twisting four PFA electric wires together, one cable obtained by twisting two PFA electric wires together, and one FEP tube were arranged horizontally. A long body was produced by disposing the covering layers over and under the arranged covering targets and fixing the positions of the respective covering targets by heating web portions.

An evaluation result of cleanliness is shown in Table 1.

Example 3

A PTFE resin film was used as an outermost layer, a 0.02-μm-thick FEP resin film was used as an adhesive layer located inside the outermost layer, another PTFE resin film was used as an intermediate layer located further inside, and a 0.02-μm-thick FEP resin film was used as an adhesive layer located still further inside. Resin films that had been cut so as to have a prescribed width were prepared. A thickness, a PV value, and a density of the resin film of each of the outermost layer or the intermediate layer were measured. Results are shown in Table 1.

Next, a covering layer was produced by laminating and heating the four resin films. Covering targets were prepared in such a manner that one FEP electric wire, one FEP electric wire, one cable obtained by twisting four PFA electric wires together, one cable obtained by twisting two PFA electric wires together, and one FEP tube were arranged horizontally. A long body was produced by disposing the covering layers over and under the arranged covering targets and fixing the positions of the respective covering targets by heating web portions.

An evaluation result of cleanliness is shown in Table 1.

Example 4

An FEP resin film was used as an outermost layer, a PTFE resin film was used as an intermediate layer inside the outermost layer, and a 0.02-μm-thick FEP resin film was used as an adhesive layer located further inside. Resin films that had been cut so as to have a prescribed width were prepared. A thickness, a PV value, and a density of the resin film of each of the outermost layer or the intermediate layer were measured. Results are shown in Table 1.

Next, a covering layer was produced by laminating and heating the three resin films. Covering target was prepared by twisting one cable obtained by twisting four PFA electric wires together and four FEP electric wires together. A long body was produced by winding the covering layer around the outside of the twisted covering target so as to doubly overlap, and fixing the positions of the respective covering targets by heating.

An evaluation result of cleanliness is shown in Table 1.

Example 5

A PEEK resin film was used as an outermost layer, a PTFE resin film was used as an intermediate layer located inside the outermost layer, and a 0.02-μm-thick FEP resin film was used as an adhesive layer located further inside. Resin films that had been cut so as to have a prescribed width were prepared. A thickness, a PV value, and a density of the resin film of each of the outermost layer or the intermediate layer were measured. Results are shown in Table 1.

Next, a covering layer was produced by laminating and heating the three resin films. Covering targets were prepared in such a manner that one FEP electric wire, one FEP electric wire, one cable obtained by twisting four PFA electric wires together, one cable obtained by twisting two PFA electric wires together, and one FEP tube were arranged horizontally. A long body was produced by disposing the covering layers over and under the arranged covering targets and fixing the positions of the respective covering targets by heating web portions.

An evaluation result of cleanliness is shown in Table 1.

Example 6

A PTFE resin film was used as an outermost layer and a PE resin film was used as an intermediate layer located inside the outermost layer. Resin films that had been cut so as to have a prescribed width were prepared. A thickness, a PV value, and a density of the resin film of each of the outermost layer or the intermediate layer were measured. Results are shown in Table 1.

Next, a covering layer was produced by laminating and heating the two resin films. Covering targets were prepared in such a manner that one FEP electric wire, one FEP electric wire, one cable obtained by twisting four PFA electric wires together, one cable obtained by twisting two PFA electric wires together, and one FEP tube were arranged horizontally. A long body was produced by disposing the covering layers over and under the arranged covering targets and fixing the positions of the respective covering targets by heating web portions.

An evaluation result of cleanliness is shown in Table 1.

Example 7

A PTFE resin film was used as an outermost layer and another PTFE resin film was used as an intermediate layer located inside the outermost layer. Resin films that had been cut so as to have a prescribed width were prepared. A thickness, a PV value, and a density of the resin film of each of the outermost layer or the intermediate layer were measured. Results are shown in Table 2.

Next, a covering layer was produced by laminating and heating the two resin films. Covering targets were prepared in such a manner that one FEP electric wire, one FEP electric wire, one cable obtained by twisting four PFA electric wires together, one cable obtained by twisting two PFA electric wires together, and one FEP tube were arranged horizontally. A long body was produced by disposing the covering layers over and under the arranged covering targets and fixing the positions of the respective covering targets by heating web portions.

An evaluation result of cleanliness is shown in Table 2.

Example 8

An FEP resin film was used as an outermost layer, a PTFE resin film was used as an intermediate layer located inside the outermost layer, and a 0.02-μm-thick FEP resin film was used as an adhesive layer located further inside. Resin films that had been cut so as to have a prescribed width were prepared. A thickness, a PV value, and a density of the resin film of each of the outermost layer or the intermediate layer were measured. Results are shown in Table 2.

Next, each covering layer was produced by laminating and heating the three resin films. Covering targets were prepared in such a manner that one FEP electric wire, one FEP electric wire, one cable obtained by twisting four PFA electric wires together, one cable obtained by twisting two PFA electric wires together, and one FEP tube were arranged horizontally. Along body was produced by disposing the covering layers over and under the arranged covering targets and fixing the positions of the respective covering targets by heating web portions.

An evaluation result of cleanliness is shown in Table 2.

Example 91

A PTFE resin film was used as an outermost layer, another PTFE resin film was used as an intermediate layer located inside the outermost layer, and a 0.02-µm-thick FEP resin film was used as an adhesive layer located further inside. Resin films that had been cut so as to have a prescribed width were prepared. A thickness, a PV value, and a density of the resin film of each of the outermost layer or the intermediate layer were measured. Results are shown in Table 2.

Next, a covering layer was produced by laminating and heating the three resin films. Covering target was prepared by twisting one cable obtained by twisting four PFA electric wires together and four FEP electric wires together. A long body was produced by winding the covering layer around the outside of the twisted covering target so as to doubly overlap, and fixing the positions of the respective covering target by heating.

An evaluation result of cleanliness is shown in Table 2.

Example 10

A PTFE resin film was used as an outermost layer, a 0.02-µm-thick FEP resin film was used as an adhesive layer located inside the outermost layer, another PTFE resin film was used as an intermediate layer further inside, and a 0.02-µm-thick FEP resin film was used as an adhesive layer located still further inside. Resin films that had been cut so as to have a prescribed width were prepared. A thickness, a PV value, and a density of the resin film of each of the outermost layer or the intermediate layer were measured. Results are shown in Table 2.

Next, a covering layer was produced by laminating and heating the four resin films. Covering targets were prepared in such a manner that one FEP electric wire, one FEP electric wire, one cable obtained by twisting four PFA electric wires together, one cable obtained by twisting two PFA electric wires together, and one FEP tube were arranged horizontally. A long body was produced by disposing the covering layers over and under the arranged covering targets and fixing the positions of the respective covering targets by heating web portions.

An evaluation result of cleanliness is shown in Table 2.

Example 11

A PEEK resin film was used as an outermost layer, a PTFE resin film was used as an intermediate layer located inside the outermost layer, and a 0.02-µm-thick FEP resin film was used as an adhesive layer located further inside. Resin films that had been cut so as to have a prescribed width were prepared. A thickness, a PV value, and a density of the resin film of each of the outermost layer or the intermediate layer were measured. Results are shown in Table 2.

Next, a covering layer was produced by laminating and heating the three resin films. Covering targets were prepared in such a manner that one FEP electric wire, one FEP electric wire, one cable obtained by twisting four PFA electric wires together, one cable obtained by twisting two PFA electric wires together, and one FEP tube were arranged horizontally. A long body was produced by disposing the covering layers over and under the arranged covering targets and fixing the positions of the respective covering targets by heating web portions.

An evaluation result of cleanliness is shown in Table 2.

Example 12

A PTFE resin film was used as an outermost layer and a PE resin film was used as an intermediate layer located inside the outermost layer. Resin films that had been cut so as to have a prescribed width were prepared. A thickness, a PV value, and a density of the resin film of each of the outermost layer or the intermediate layer were measured. Results are shown in Table 2.

Next, a covering layer was produced by laminating and heating the two resin films. Covering targets were prepared in such a manner that one FEP electric wire, one FEP electric wire, one cable obtained by twisting four PFA electric wires together, one cable obtained by twisting two PFA electric wires together, and one FEP tube were arranged horizontally. A long body was produced by disposing the covering layers over and under the arranged covering targets and fixing the positions of the respective covering targets by heating web portions.

TABLE 1

|  | Ex. 1 | Ex. 2 | Ex. 3 | Ex. 4 | Ex. 5 | Ex. 6 |
|---|---|---|---|---|---|---|
| Thickness of intermediate layer (mm) | 0.84 | 0.12 | 0.80 | 0.40 | 0.80 | 0.80 |
| Thickness of outermost layer (mm) | 0.10 | 0.01 | 0.10 | 0.03 | 0.01 | 0.01 |
| PV1 (µm) | 9.40 | 7.47 | 5.95 | 8.10 | 8.10 | 9.80 |
| PV2 (µm) | 1.40 | 0.76 | 3.90 | 0.12 | 1.63 | 1.40 |
| PV1 − PV2 (µm) | 8.00 | 6.71 | 2.05 | 7.98 | 6.47 | 8.40 |
| ρ1 (g/cm$^3$) | 0.67 | 0.45 | 1.78 | 0.75 | 1.15 | 0.45 |
| ρ2 (g/cm$^3$) | 2.15 | 1.75 | 2.10 | 2.20 | 1.26 | 2.25 |
| ρ2 − ρ1 (g/cm$^3$) | 1.48 | 1.30 | 0.32 | 1.45 | 0.11 | 1.80 |
| Cleanliness | 5 | 5 | 5 | 5 | 4 | 5 |

TABLE 2

|  | Ex. 7 | Ex. 8 | Ex. 9 | Ex. 10 | Ex. 11 | Ex. 12 |
|---|---|---|---|---|---|---|
| Thickness of intermediate layer (mm) | 0.84 | 0.12 | 0.40 | 0.80 | 0.40 | 0.80 |
| Thickness of outermost layer (mm) | 0.10 | 0.01 | 0.02 | 0.01 | 0.01 | 0.01 |
| PV1 (µm) | 8.15 | 7.47 | 8.10 | 7.47 | 5.95 | 8.13 |
| PV2 (µm) | 9.10 | 8.15 | 11.41 | 7.60 | 6.81 | 10.42 |
| PV2 − PV1 (µm) | 0.95 | 0.68 | 3.31 | 0.13 | 0.86 | 2.29 |
| ρ1 (g/cm$^3$) | 0.78 | 0.50 | 1.10 | 0.67 | 0.80 | 0.45 |
| ρ2 (g/cm$^3$) | 1.85 | 1.75 | 1.58 | 2.15 | 1.30 | 2.15 |
| ρ2 − ρ1 (g/cm$^3$) | 1.07 | 1.25 | 0.48 | 1.48 | 0.50 | 1.70 |
| Cleanliness | 5 | 4 | 4 | 4 | 4 | 4 |

Each Example exhibited good results, that is, was superior in bendability, flexibility, and cleanliness and the covering layer themselves of long body produced less amounts of pollutants, which means a low degree of pollution caused in the surroundings.

INDUSTRIAL APPLICABILITY

The long body according to the invention is superior in slipperiness, bendability, and flexibility and is low in pollution caused in the surroundings, and thus, can be used in semiconductor manufacturing machines and measurement instruments that a cleanliness is required.

DESCRIPTION OF SYMBOLS

100: Long body (flat shape), 110: Covering layer, 112: Intermediate layer, 113: Outermost layer, 200: Long body (round shape), 210: Covering layer.

CITATION LIST

Patent Literature

Patent document 1: JP-A-2006-19125

The invention claimed is:

1. A method of producing a long body covered with a covering layer, wherein
the long body at least includes a plurality of covering targets selected from the group consisting of electric wires and tubes,
the covering layer at least includes an intermediate layer and an outermost layer,
the intermediate layer employs a resin film having a density $\rho 1$ of 0.2 g/cm$^3$ or more and 1.8 g/cm$^3$ or less and having a PV1 value, which is a surface peak-to-valley value, of 5 μm or more,
the outermost layer employs a resin film having a density $\rho 2$ of 1.2 g/cm$^3$ or more and 2.5 g/cm$^3$ or less, the method comprises at least:
covering the long body with the covering layer, wherein the intermediate layer is positioned closer to the covering targets than the outermost layer; and
fixing positions of the plurality of covering targets with the covering layer, and
the following formulas (1) and (3) are satisfied in the case that a PV2 value, which is a surface peak-to-valley value of the outermost layer, is 5 μm or less, and the following formulas (2) and (3) are satisfied in the case that the PV2 value is larger than 5 μm:

$$PV1-PV2 \geq 2 \ \mu m \tag{1}$$

$$PV2-PV1 > 0 \ \mu m \tag{2}$$

$$\rho 2 - \rho 1 \geq 0.1 \ g/cm^3 \tag{3},$$

2. The method of producing the long body covered with the covering layer according to claim 1, wherein the intermediate layer has a porous structure including a plurality of pores.

3. The method of producing the long body covered with the covering layer according to claim 1, wherein the covering layer further includes a functional layer.

4. The method of producing the long body covered with the covering layer according to claim 2, wherein the covering layer further includes a functional layer.

* * * * *